May 20, 1952     C. C. COONS     2,597,777
ABSORPTION REFRIGERATING APPARATUS
Filed Sept. 28, 1948     3 Sheets-Sheet 1

INVENTOR.
Curtis C. Coons
BY
Harry S. Dumass
ATTORNEY.

May 20, 1952 C. C. COONS 2,597,777
ABSORPTION REFRIGERATING APPARATUS
Filed Sept. 28, 1948 3 Sheets-Sheet 2

Fig. 4

INVENTOR.
Curtis C. Coons
BY
Harry S. ~~~~~
ATTORNEY.

May 20, 1952 — C. C. COONS — 2,597,777
ABSORPTION REFRIGERATING APPARATUS
Filed Sept. 28, 1948 — 3 Sheets-Sheet 3

Fig. 5

INVENTOR.
Curtis C. Coons
BY
Harry S. Dunarr
ATTORNEY.

Patented May 20, 1952

2,597,777

UNITED STATES PATENT OFFICE 2,597,777

ABSORPTION REFRIGERATING APPARATUS

Curtis C. Coons, North Canton, Ohio, assignor to The Hoover Company, North Canton, Ohio, a corporation of Ohio Application September 28, 1948, Serial No. 51,554

15 Claims. (Cl. 62—5)

The present invention relates to the art of refrigeration and more particularly to an absorption type refrigerating apparatus of the air cooled type in which auxiliary means are provided to maintain the ice freezing compartment under temperature conditions sufficient to preserve sharp frozen food stuffs and to freeze water.

It has been found that conventional types of inert gas absorption refrigerating machines will not quite maintain a freezing compartment in the upper portion of the cabinet structure at temperatures which are safe for the preservation of sharp frozen food stuffs under some operating conditions. This marginal failure of previous constructions results partly from the inability of the evaporator to reach temperatures quite low enough for the preservation of sharp frozen food stuffs and partly from the fact that the deep condenser of the apparatus necessitated placing the evaporator in the bottom portion of the freezing compartment in the form of a shelf. Since the cold producing unit is in the bottom of the compartment the air circulation therein is poor and a wide temperature differential has been found to exist between the shelf resting on the evaporator and the top of the compartment.

It is accordingly an object of the present invention to provide a refrigerating apparatus of the above mentioned type with a booster evaporator which can be positioned in the top portion of the aforesaid freezing compartment. The booster evaporator operates at a temperature somewhat below the temperature of the principal evaporator. The booster evaporator meets the marginal deficiency of the apparatus above mentioned, that is, it serves to provide a cold spot in the upper portion of the compartment so as to maintain air circulation and substantially uniform temperatures through its vertical height and to lower the temperature the few degrees necessary to insure proper preservation of sharp frozen food stuffs. Because of these considerations the booster evaporator must operate at a low temperature but does not have a large capacity as compared with the principal evaporator of the system.

In accordance with the present invention it is an object thereof to provide an apparatus of the above described character in which the low temperature booster evaporator is supplied with substantially anhydrous liquid refrigerant and with inert gas having an unusually low refrigerant vapor content to facilitate the production of low temperatures but using only air cooled parts for rejecting heat from the apparatus to the air surrounding the cabinet structure.

It has further been found in conventional types of apparatuses having an upper freezing compartment extending substantially across the horizontal extent of the cabinet construction and a lower evaporator for refrigerating the principal food storage compartment of the apparatus that the food storage compartment may be refrigerated to undesirably low temperatures under certain operating conditions. This is particularly true as it is substantially necessary to govern the apparatus by the temperature conditions prevailing in the ice freezer in most instances. It is accordingly an object of the present invention to provide a construction of the foregoing character in which the supply of liquid refrigerant to the evaporator which refrigerates the air in the principal food storage compartment is governed in accordance with the temperature thereof by a mechanism which is operated by waste heat and which contains no moving parts within the pressure retaining walls of the refrigerating system proper.

It is a more particular object of the present invention to provide a refrigerator having distinct refrigerating compartments operating at different temperature levels with a vapor lock mechanism for regulating the supply of liquid refrigerant to the higher temperature compartment.

Other objects and advantages of the invention will become apparent as the description proceeds when taken in connection with the accompanying drawings in which.

The present application is an improvement over my copending application Serial No. 51,555, filed September 28, 1948.

Figures 1, 2, 3:
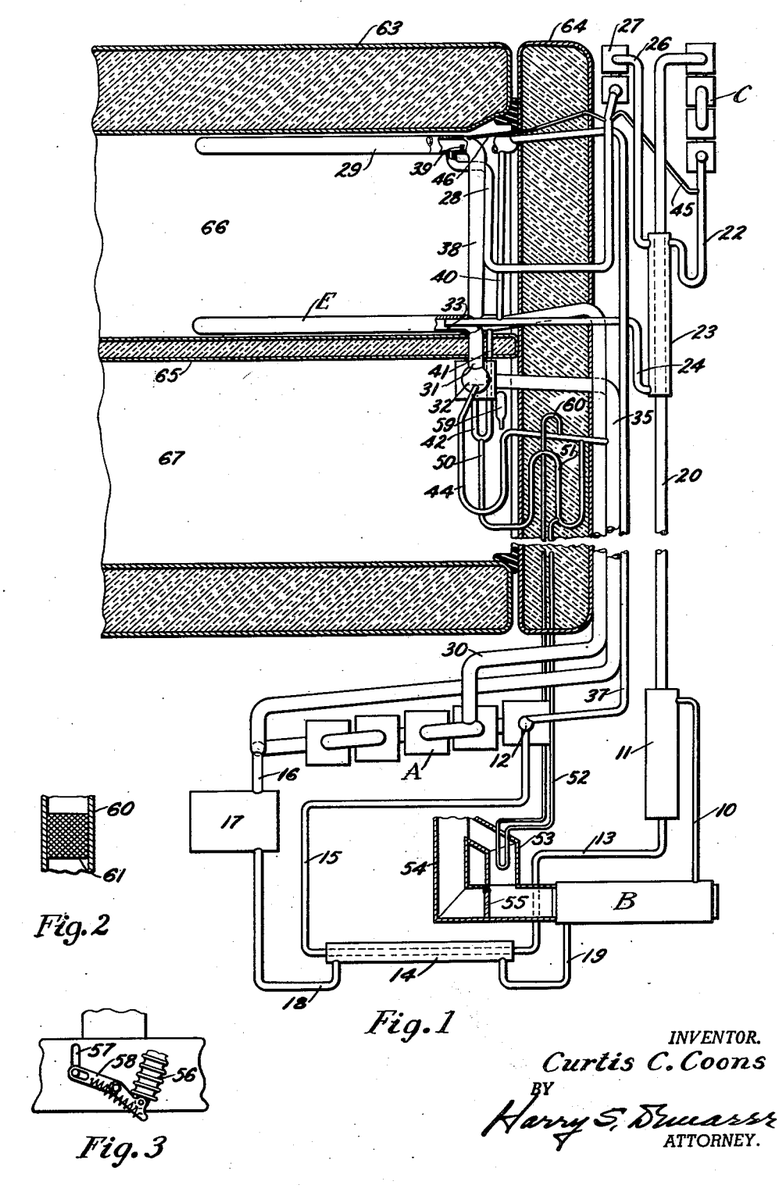
Figure 1 is a side vertical elevational view of the refrigerating apparatus shown partly schematically embodying the present invention.
Figure 2 is a view of a detail of the apparatus of Figure 1 shown on an enlarged scale.
Figure 3 is a fragmentary view of a detail of a control mechanism embodied in Figure 1.

Referring to the drawing in detail and first to Figures 1 and 2 thereof, the refrigerating apparatus illustrated is of the inert gas absorption type which is charged with a vaporizable refrigerant such as ammonia, an absorbent therefor such as water, and a pressure equalizing medium which is inert with respect to the refrigerant and the absorbent such as hydrogen.

The apparatus comprises a generator B which is heated by any suitable means, not shown. When heat is applied to the generator, refrigerant vapor is evolved from the strong absorbing solution therein. The vapor so evolved operates a vapor lift conduit 10 to convey weak solution and the vapor into a separation chamber 11. The weak solution separated in the chamber 11 then flows through the conduit 13, liquid heat exchanger 14 and conduit 15 to the upper portion of an inclined air cooled absorber conduit 12. The solution flows downwardly through the absorber conduit 12 and the tubular air cooled absorber A in both of which it contacts a mixture of inert gas refrigerant vapor in order to absorb refrigerant from the inert gas and to increase the refrigerant content of the solution. The enriched solution formed in the absorbers A and 12 is then returned to the generator by the conduit 16, a solution reservoir 17, the conduit 18, liquid heat exchanger 14 and conduit 19 thus completing the absorbing solution circuit.

The refrigerant vapor which is separated in the chamber 11 is conducted therefrom to the primary condenser C by the conduit 20. The vaporous refrigerant is condensed in the condenser C and flows through a U-shaped liquid sealed trap forming conduit 22 to a heat exchanger 23 surrounding the hot vapor pipe 20. A portion of the liquid supplied to the heat exchanger 23 is vaporized therein, however, the major portion of the liquid flows through the heat exchanger 23 and the conduit 24 into the principal evaporator E.

The refrigerant vapors formed in the jacket 23 by heat abstracted from the hot vapors in the conduit 20 are substantially pure anhydrous ammonia vapors. These anhydrous vapors are conducted through a conduit 26 into a second small condenser 27 wherein they are condensed. Anhydrous liquid refrigerant flows from the condenser 27 through the conduit 28, which includes a U-shaped gas sealing trap section, into a secondary booster evaporator 29.

The principal evaporator E is linked in an inert gas circuit with the absorber A. Lean inert gas flows through conduit 30 from the absorber A to the evaporator E. This inert gas flows through the evaporator E in contact with and in counterflow relationship to the liquid refrigerant supplied through the conduit 24. The evaporator E is shown as a sinuous coil lying in a horizontal or substantially horizontal plane. By a substantially horizontal plane. By a substantially horizontal plane is meant that the sinuous conduit may be sloped slightly from the point at which it joins the conduit 24 to the point at which it joins the gas supply conduit 30 in order to provide a slight slope to promote the circulation of liquid refrigerant therethrough. After traversing the evaporator E the inert gas flows through a conduit 31 into a finned air cooling evaporator conduit 32. The evaporator E is provided with a small dam 33 adjacent its junction with conduit 31 to prevent liquid refrigerant from back flowing into the evaporator 32 without first passing through the evaporator E.

The specific means herein disclosed for condensing the refrigerant evolved in the generator B and for supplying separate portions of the condensate to the evaporators E and 29 is disclosed and claimed in the application of Glenn T. Piper, Serial No. 67,129, filed December 24, 1948, and assigned to the assignee of this application.

After traversing the conduit 32 the inert gas then flows to the lower end of the absorber A through the conduit 35 which is in heat exchange relation with the inert gas supply conduit 30. The enriched inert gas flows upwardly through the absorber A in contact with and counterflow relationship to the absorbing solution flowing downwardly therethrough whereby the solution is enriched and the gas is deprived of refrigerant vapor to form so called lean inert gas. This completes the primary inert gas circuit of the apparatus.

A portion of the inert gas which flows through the absorber A, approximately 25% for example, does not flow through the conduit 30 but continues on through the tube 12 which in effect is a continuation of the absorber A. This comparatively small volume of inert gas flows at a comparatively slow rate through the tube 12 and in contact with the leanest absorbing solution available in the system, consequently its refrigerant content is further reduced to a considerable degree to produce a very lean inert gas. The very lean inert gas formed in the conduit 12 is conducted therefrom by the conduit 37 to the secondary evaporator 29 through which it flows in contact with and counter to liquid refrigerant supplied from the conduit 28. After traversing the evaporator 29 the partially enriched gas flows through the conduit 38 which is in heat exchange relation with the conduit 28, into the conduit 30 adjacent the evaporator E, that is, the inert gas which traverses the evaporator 29 is only partly enriched therein and therefore is conducted into and traverses the evaporator E along with inert gas supplied from conduit 30. Both bodies of inert gas return to the lower end of the absorber A together through the evaporator 32 and the conduit 35.

The evaporator 29 is provided with a dam 39 to prevent liquid refrigerant from backflowing through conduit 38 into the evaporator E. Any liquid which traverses the evaporator 29 without evaporating therein flows through a drain conduit 40 which joins with the liquid supply conduit 24 for the evaporator E.

Liquid refrigerant which traverses the evaporator E is conducted through a conduit 41 containing a U-shaped gas sealing portion 42 into the evaporator conduit 32 wherein it evaporates to produce a high temperature refrigerating effect for a purpose to be developed more fully hereinafter. As shown in the drawings, the conduit 41 enters the conduit 32 adjacent its inert gas discharge end so that the gas and liquid flow therethrough in counterflow relationship. Any liquid which transverses the evaporator conduit 32 without evaporating flows through a U-shaped gas sealing conduit 44 into the rich gas discharge conduit 35 through which it flows to the absorber where it joins the solution circuit.

The liquid refrigerant evaporator supply conduits 22 and 28 are both provided with U-shaped sections forming liquid filled gas seals. In order to purge the condensers of uncondensed and non-condensible products a vent conduit 45 is connected between the condenser side of the gas sealing trap in conduit 22 and the condenser side of the gas sealing trap in conduit 28. A vent conduit 46 then connects the condenser side of the gas sealing trap in conduit 28 to the gas outlet portion of the evaporator 29 to purge the condensers of uncondensed and non-condensible products.

A mechanism is provided for governing the flow of refrigerant liquid to the conduit 32 in accordance with the temperature thereof or the temperature of the compartment which this conduit refrigerates.

For this purpose the bight portion of the U-shaped conduit 42 connects to one leg of a W-shaped pipe 50, the other end of which connects to the gas heat exchanger side of the drain conduit 44. The central part of the W-shaped pipe 50 consists of an inverted U-shaped section 51 arranged to form a vapor lock. The bight portion of the U-shaped conduit 51 connects to one leg of an elongated U-shaped conduit 52. The other leg of the U-shaped conduit 52 connects to the lower end of the leg of the U-shaped conduit 51 which is connected to the conduit 44. The bight portion of the conduit 52 extends into a heating chamber 53 which is formed as a by-pass section in a products of combustion discharge flue 54. A flap valve 55 is pivotally mounted in the products of combustion discharge flue 54. In the position shown in Figure 1 products of combustion which have traversed the boiler B discharge through the by-pass 53 and contact the bight portion of U-shaped conduit 52. In the opposite position of the valve 55 the entrance to the by-pass 53 is cut off and products of combustion discharge through the flue 54 without traversing and contacting the conduit 52. As shown more clearly in Figure 3, the valve 55 is actuated by a bellows 56 connected to an actuating bell crank 57 for the valve by a snap acting mechanism 58. The bellows 56 is provided with a bulb 59, see Figure 1, which may be responsive to the temperature of the conduit 32 or the temperature of the chamber which is refrigerated by the evaporator conduit 32. The arrangement is such that the bellows operates the snap acting mechanism to operate the valve 55 to the position shown in Figure 1 when the temperature of the chamber refrigerated by the conduit 32 exceeds a predetermined temperature, for example 45° F. The bellows operates the valve 55 to close the entrance of the by-pass 53 when the temperature of the chamber drops below another predetermined temperature, for example 40° F.

The W-shaped conduit 50 in effect forms a drain for by-passing liquid refrigerant around the evaporator 32 from the conduit 42 into the gas conduit 35. When the valve 55 is operated to the position shown in Figure 1, refrigerant in the conduit 52 is vaporized filling the bight portion of the conduit 51 with vapor to form a vapor lock which blocks the flow of refrigerant through the conduit 50 and forces the liquid to flow into the evaporator conduit 32. When the valve 55 is moved to shut off the by-pass 53, the vapor in the conduit 51 condenses and liquid then flows from the evaporator E through conduit 41, conduit 42 and conduit 51 into the gas conduit 35 thus by-passing the evaporator conduit 32. The U-shaped conduit 52 insures a constant supply of vapor to maintain the vapor lock as it will be appreciated that even though the same is insulated there will be some condensation therein which would tend to collapse the lock even during times when it is desired that it should be maintained. Thus there is a slow circulation through the conduit 52 representing the slow vaporization which occurs in order to maintain the vapor lock in the conduit 51.

A slow leak conduit 60 connecting the bight portion of the vapor lock conduit 51 and conduit 44 prevents the vapor lock from becoming gas bound due to entrained inert gas which may be carried therewith with the liquid refrigerant. As shown more clearly in Figure 2, the conduit 60 includes a porous metal block 61 which will allow a very slow seepage of inert gas therethrough in order to purge the conduit 51 of inert gas. The porous metal block 61 can be made with the proper porosity and density so that it is substantially impervious to the comparatively dense refrigerant while permitting a slow seepage of inert gas.

The refrigerating apparatus in Figure 1 is shown as being associated with an insulated refrigerated cabinet 63 having an insulated removable rear wall portion 64 to permit the evaporating mechanism to be inserted into the interior of the cabinet 63. The cabinet is interiorly divided by an insulated partition 65 into an upper freezing compartment 66 and a lower food storage compartment 67. The evaporator 29 is arranged in the top portion of the compartment 66, whereas the evaporator E is arranged in the bottom portion thereof and may be covered with a suitable sheet metal or cast plate or the like, not shown, to provide a smooth continuous surface upon which ice trays or frozen foods may be rested. The evaporator 32 is positioned in the upper rear corner of the compartment 67 and serves to refrigerate the same by cooling the air in said compartment.

Due to the action of the vapor lock controlled by-pass for liquid refrigerant around the evaporator 32 this evaporator is prevented from lowering the temperature in the compartment 67 below some predetermined minimum such as 40° F. Furthermore the undesirable dehydration of food stuffs stored in the compartment 67 is prevented because the evaporator 32 operates at a comparatively high temperature.

With the foregoing arrangement the temperature in the compartment 66 may be maintained low enough throughout its extent to insure safe preservation of sharp frozen food stuffs. The major refrigerating load is carried by the evaporator E which will carry substantially the entire freezing load represented by heat removed in the process of freezing water. Since the evaporator 29 receives substantially anhydrous liquid refrigerant and very highly stripped inert gas the evaporating process occurs therein at a very low temperature which may be in the order of 5° F. or therebelow. This provides a cold spot in the upper portion of the compartment 66 and serves to lower the temperature of the compartment and its content a few degree below the lowest temperature which could be maintained therein by the evaporator E operating alone. In addition, the very cold low temperature evaporator 29 positioned in the top portion of the compartment insures air circulation within the compartment 66 which tends to maintain uniform temperatures throughout this compartment. This last is highly important as it has been found by experience that packages of frozen food stuffs piled one on top of another in such a compartment as compartment 66 will in time exhibit a progressively higher temperature as their vertical distance from the evaporator E increases. The small low temperature booster evaporator 29 effectively eliminates this disadvantageous and undesirable condition.

The condenser 27 has a small capacity, hence, its vertical depth may be small which will permit the evaporator 29 to be placed in the top of the compartment 66 while allowing a high position for the condenser 27 to insure the gravity flow of liquefied refrigerant into the evaporator 29.

The absorber A forming the principal absorber of the apparatus is preferably of conventional size and configuration. The absorber 12 shown here comprises simply a continuation of the tubing and finning construction forming the absorber A. The end of the absorber A is determined by the point at which the conduit 30 connects to it. The resistances of the two paths of flow of inert gas are so proportioned that approximately seventy-five percent, more or less, of the total amount of inert gas applied to the absorber A will leave through the conduit 30 whereas the remainder will flow through the absorber section 12. The inert gas which flows into the absorber 12 is lean inert gas and contacts the leanest solution available in the system under conditions such that the volume of inert gas refrigerant vapor mixture flowing over the absorbent is comparatively small per unit of time and the rate of flow of the inert gas is comparatively slow due to the small total flow through the absorber 12. It is desirable to arrange the absorber 12 in the air flue so that it is in the most favorable cooling position and operates at the lowest possible temperature to facilitate stripping of the inert gas. Due to the foregoing conditions, absorption proceeds in the section 12 to produce a highly stripped inert gas which flows through the conduit 37 to the evaporator 29 to produce low temperature refrigeration therein.

Figure 4:
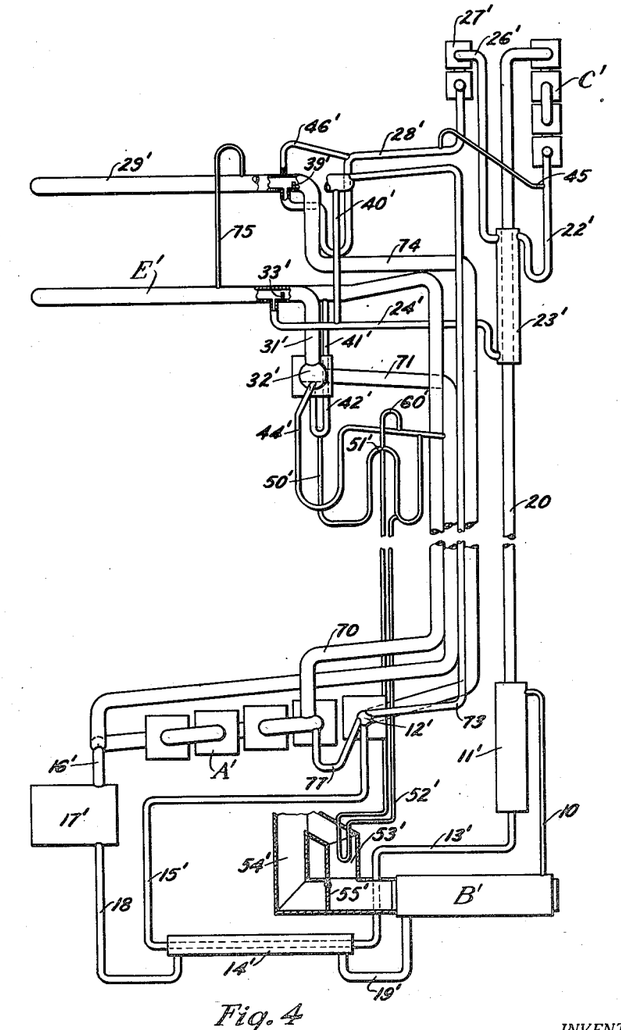
Figure 4 is a schematic representation of a modified form of the invention.

Referring now to Figure 4, a modified form of the invention is illustrated. This apparatus is intended to be assembled with a cabinet exactly similar to the cabinet structure illustrated in Figure 1. The cabinet structure has been omitted in Figure 4 for clarity in illustration.

The major portion of the apparatus in Figure 4 is identical with that above described in connection with Figure 1. In order to eliminate unnecessary duplication of disclosure those portions of the apparatus of Figure 4 which are identical with corresponding portions of the apparatus of Figure 1 are given the same reference characters distinguished by the addition of a prime.

The Figure 4 form of the apparatus differs principally from the Figure 1 form of the apparatus in the provision of two distinct inert gas circuits and in that the absorbers A' and 12' are distinct entities instead of being continuations of a single construction.

The evaporators E' and 32' and the absorber A' are linked in a first principal inert gas circuit. Lean inert gas formed in the absorber A' is conducted from the upper portion thereof to the evaporator E' by conduit 70. After traversing the evaporator E' the inert gas flows through the conduit 31', the evaporator 32', and returns to the lower portion of the absorber A' through the conduit 71 which completes the principal inert gas circuit.

The evaporator 29' is linked with the absorber 12' in a distinct inert gas circuit which is as follows: The lean inert gas formed in the absorber 12' flows through the conduit 73 to the gas inlet portion of the evaporator 29'. After traversing the evaporator 29' the partly enriched inert gas is then returned to the absorber 12' by way of the conduit 74 which is in heat exchange with the refrigerant supply conduit 28'.

In view of the provision of two distinct inert gas circuits in the present modification of the invention an equalizing connection 75 is provided which connects the gas spaces of the evaporators 29' and E' and hence the two inert gas circuits. This conduit also acts as the ultimate purge on the condensers C' and 27' in the following manner: The vent conduit 45' for condenser C' connects to the conduit 28' which is vented through conduit 46' to the evaporator 29', hence non-condensable products, for example, which flow through the conduit 46' may be purged to the principal inert gas circuit through the conduit 75.

The liquid refrigerant flow between the various evaporators as well as the vapor lift pump flow control for regulating the supply of liquid refrigerant to evaporator 32' are all identical with the Figure 1 form of the invention.

In this form of the invention the absorbing solution which has traversed the absorber 12' is conveyed therefrom through a U-shaped trap sealed conduit 77 into the upper end of the absorber A' through which it flows in the usual manner.

The gas conducting conduits 70, 71, 73 and 74 are in heat exchange relation in order to cool the inert gas ascending through the conduits 70 and 74 to promote the efficiency of evaporation.

This form of the invention is particularly preferred for designs in which a proper proportioning of resistances in the gas circuits may not be feasible to provide a proper split of the inert gas which has traversed the principal absorber as in the Figure 1 form of the invention. This form of the invention also allows somewhat greater flexibility to the designer at the cost of a small additional amount of piping. In this form of the invention all of the vapor formed in the secondary evaporator 29' must be absorbed in the secondary absorber 12' as distinguished from the Figure 1 form of the invention in which a portion of this vapor may be absorbed in the principal absorber A. For that reason, other things being equal, the absorber A' may have a smaller capacity than the absorber A and the absorber 12' should have a slightly larger capacity than the absorber 12. The rate of inert gas circulation in the secondary inert gas circuit may be the same as in the auxiliary branch inert gas circuit of the Figure 1 form of the invention, that is, up to approximately 25% of the rate of inert gas circulation in the principal inert gas circuit.

Figure 5:
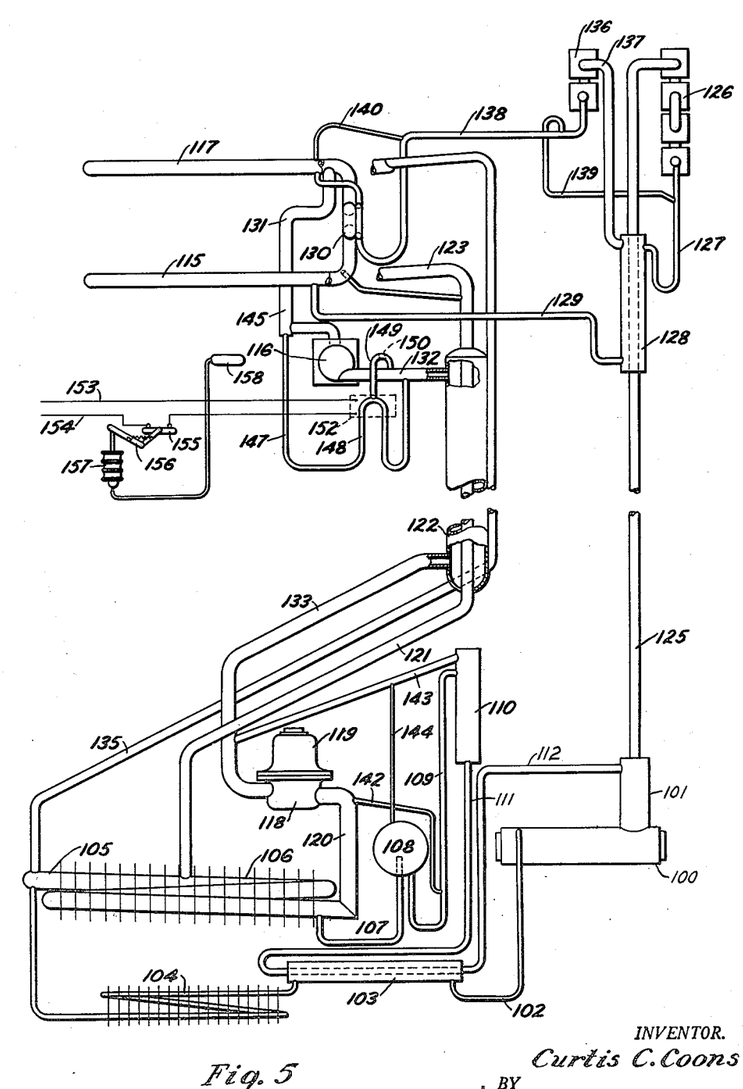
Figure 5 is a schematic representation of a second modification of the invention.

A further modification of the invention applied to the type of refrigerating system in which the inert gas is positively propelled is illustrated in Figure 5. The cabinet construction has been omitted from this figure to promote clarity in illustration, but it is identical with that disclosed in Figure 1 and the apparatus will be assembled in substantially the same manner.

In this form of the invention it is preferable to use a dense inert gas such as nitrogen as distinguished from a light inert gas such as hydrogen which is preferred for types of apparatus illustrated in Figures 1 and 4 in which the inert gas is circulated by gravity.

In this form of the invention the solution circuit comprises a generator 100 and associated analyzer 101 through which vapor produced in the generator passes in contact with strong solution flowing through the analyzer to the boiler. The solution which is weakened in the generator 100 flows therefrom through the conduit 102, liquid heat exchanger 103, solution precooler conduit 104 and discharges into the upper end of a secondary air cooled absorber 105 which is formed as an extension on the primary air cooled absorber 106. The solution flows through both the absorbers by gravity into contact with and in counter-flow relationship to inert gas whereby it is enriched. After traversing the absorber the solution flows through a conduit 107 into a solution reservoir 108 from which it is withdrawn into a gas lift circulating pump 109 discharging into a separation chamber 110. From the chamber 110 the enriched solution flows through conduit 111, the liquid heat exchanger 103, and the conduit 112 back to the analyzer to complete the solution circuit.

The absorbers 105 and 106 are linked in a spit or branched inert gas circuit with the principal freezing evaporator 115, the food storage space cooling evaporator 116, and a low temperature booster evaporator 117. The inert gas in all parts of the circuit is propelled by a gas pumping device 118 which is driven by an hermitically sealed electrical motor 119. Inert gas which is placed under pressure in the pump 118 flows therefrom through a conduit 120 into the lower portion of the absorber 106 through which it flows counter to the solution but in contact therewith. The major portion of the inert gas which has traversed the absorber 106 then flows through gas conduit 121, the inner passage of a gas heat exchanger 122 and conduit 123 to the lower gas inlet portion of the principal evaporator 115.

Refrigerating liquid is supplied to the lower gas inlet portion of the evaporator 115 by the following means; vapor produced in the generating assembly 100—101 flows through the conduit 125 to a principal condenser 126 wherein it is liquefied. Liquid refrigerant then flows through a conduit 127 including a U-shaped gas sealing portion to a heat exchange vessel 128. The heat exchange vessel surrounds the hot vapor pipe 125, consequently a portion of the liquid supplied thereto is vaporized and is disposed of in a manner to be described hereinafter. The refrigerant which remains in liquid state in the vessel 128 then flows through the conduit 129 to the gas inlet portion of the evaporator 115 at which point it meets the inert gas under pressure from conduit 123.

The evaporator 115 comprises a sinuous conduit coiled in a substantially horizontal plane, corresponding to the evaporator E of Figure 1 and a vertically extending portion 130 consisting of a series of horizontal sections connected by vertical rises which will preferably be positioned at the rear of the low temperature compartment such as the compartment 66 of Figure 1. In this type evaporator the propelled dense inert gas positively circulates the liquid refrigerant supplied to the conduit 129 through all portions of the evaporators 115 and 130 as the liquid is evaporating to produce a refrigerating effect. The inert gas and unevaporated liquid which traverses the vertical section 130 of the principal evaporator structure then flows through the conduit 131 which connects to one end of the air cooling evaporator conduit 116. After traversing this evaporator conduit the inert gas is conducted by a conduit 132 to the outer passage of gas heat exchanger 122 and then through the conduit 133 to the low pressure or suction side of gas pump 118 which completes the principal branch of the inert gas circuit.

A portion of the inert gas which is circulated through absorber 106 continues on through the absorber section 105. For example, approximately 25% of the total quantity of inert gas supplied to the absorber 106 through conduit 120 may so continue into the absorber section 105. The total quantity of inert gas in absorber 105 is comparatively small, hence it flows at a reduced speed through this absorber section. The lean gas supplied to the absorber 105 contacts the leanest solution available in the system. Under these conditions the inert gas supplied to the absorber 105 is greatly reduced in refrigerant vapor content to produce a highly stripped inert gas well suited to the production of very low temperatures. The inert gas is conducted from absorber 105 to the gas inlet portion of evaporator 117 by the conduit 135, which may be in heat exchange relation with the gas heat exchanger 122.

The vapors evolved in the heat exchange jacket 128 are substantially anhydrous and are conducted therefrom to a condenser 136 by a conduit 137. The anhydrous liquid formed in the condenser 136 then flows through a conduit 138, which passes in heat exchange relation with the section 130 of evaporator 115, and terminates in the gas inlet portion of the evaporator 117.

The inert gas and liquid refrigerant flow through the evaporator 117 into the conduit 131 which forms a point of juncture between the gas outlet portions of the evaporators 117 and 130, so that all of the inert gas which circulates through the absorbers 105 and 106 is also supplied to the air cooling evaporator conduit 116.

The condensers 126 and 137, may discharge some non-condensible or non-condensed material. Such material discharged by condenser 126 is purged through the conduit 139 into conduit 138. The condenser side of the trap in the conduit 138 is vented by conduit 140 to the evaporator 117 adjacent its junction with the gas discharge conduit 131.

The inert gas circuit also includes a minor branched portion which is utilized to circulate the absorbing solution. For this purpose a small amount of the gas under pressure which discharges from the gas pump into the conduit 120 is diverted through a conduit 142 into the gas lift pump 109 below the liquid level therein in order to operate the same. The pumping gas discharged into the chamber 110 is removed through the conduit 143 to the suction conduit 133 of the circulating pump. The solution reservoir 108 is purged and is maintained substantially at the suction pressure of the circulating pump by means of the conduit 144 which connects the upper portion of the reservoir to the conduit 143.

The absorbing solution flows from the absorber assembly to the higher level reservoir 108 because the gas pressure in the absorbers is substantially the discharge pressure of the pump 118 whereas the gas pressure in the reservoir 108 is substantially the suction pressure of the gas pump 118. Since the vapor spaces of the condensers are vented through the conduit structure 138, 139 and 140 to the gas outlet portions of the evaporator structures 115 and 117 they are maintained at a pressure slightly higher than the suction pressure of the circulating pump, hence the generator pressure is lower than the absorber pressure. The generator analyzer structure is therefore positioned at an elevation above the absorbers so that solution will flow by gravity from the low pressure generator assembly into the higher pressure absorber assembly. This permits the air cooled absorber to be positioned at the lowest available level in the mechanism compartment which facilitates air cooling thereof.

The foregoing arrangement is of general application but has special value in the present multi-temperature system in that the gas pump must be in a part of the gas circuit which is common to both paths of flow of inert gas. This requirement is best met by placing the pump in the common rich gas return conduits 120 and 133 and placing the absorber under the discharge pressure of the gas pump.

This form of the invention, like those previously described, is provided with a means for controlling the supply of liquid refrigerant to the air cooling evaporator conduit 116. For this purpose the conduit 131 is constructed with a liquid trap, as indicated at 145, to prevent liquid discharged thereinto from flowing directly into the evaporator conduit 116. Liquid supplied to conduit 131 flows into the liquid trap and then into a W-shaped conduit 147, which includes an inverted U-shaped central portion 148, adapted to form a liquid flow preventing vapor lock. The discharge end of the conduit 147 connects to the gas discharge conduit 132 for the evaporator conduit 116. Therefore, liquid refrigerant is by-passed around the conduit 116 when the vapor lock 148 is open to flow of liquid. The bight portion of the conduit 148 is provided with a vent conduit 149 connecting to the conduit 132. This conduit includes a porous metallic insert 150 which is more porous than insert 61. The insert 150 allows some refrigerant vapor and any inert gas which reaches the conduit 148 to vent to the inert gas circuit. Since the inert gas used in this form of the invention is denser than the refrigerant, the insert must be porous enough to allow inert gas to pass in very small quantities. Some refrigerant will also pass through the insert as the refrigerant is lighter than the inert gas. The bight portion of the conduit 148 is in heat exchange with an electric heating device 152 adapted to be energized by electrical conductors 153 and 154. The conductor 154 includes a switch mechanism 155 adapted to be operated by a snap acting mechanism 156 which is actuated by a thermostatic bellows 157. The bellows responds to temperature changes in the air contacting its actuating bulb 158 to expand and contract. The bulb 158 will be exposed to air in the compartment which is refrigerated by the evaporator 116. When the temperature in that compartment exceeds some predetermined value, such as 45° F. for example, the bellows will expand and actuate the snap acting mechanism 156 to move the switch 155 to closed circuit position to energize the heating element 152. The heating element 152 vaporizes liquid in the upper portion of the U-shaped conduit 148 and establishes a vapor lock therein which prevents liquid refrigerant from flowing through the conduit 147. When this condition occurs liquid quickly accumulates in an amount sufficient to overflow the trap 145 and to flow into the evaporator 116 through the gas conduit 131, to produce refrigeration therein in the evaporator 116. When the temperature in the compartment refrigerated by the evaporator conduit 116 drops below some predetermined value such as 40° F. the bellows 157 contract, switch 155 opens, the heating element 152 is deenergized and the vapor in the conduit 148 condenses and is partly relieved through the conduit 149. The conduit 149 does not cause the vapor lock to collapse when the heater 152 is energized because fresh liquid constantly vaporizes to replace the small amounts lost through conduit 149. When the vapor lock is removed liquid refrigerant by-passes evaporator 116 by flowing through conduit 148 into the gas heat exchanger wherein it evaporates into the rich inert gas and performs a useful function in cooling the lean inert gas flowing to the evaporators 115 and 117.

In each form of the invention herein disclosed the apparatus is characterized by what is essentially a conventional absorption refrigerating machine having an absorber extension which receives all of the absorbing solution circulating through the solution circuit and a comparatively small quantity of lean inert gas. This lean inert gas flows comparatively slowly through the absorber extension in contact with the solution as a result of which it is stripped of refrigerant vapor to a high degree. The small amount of stripped inert gas is then conducted to a booster evaporator which receives a small proportion of the total liquid refrigerant which is supplied to the whole evaporator system. The combination of the very lean inert gas and anhydrous liquid refrigerant which is supplied to the booster evaporator promotes low temperature evaporation which serves to supplement and augment the principal evaporator to an extent and in a manner to insure the preservation of sharp frozen food stuffs at uniform low temperature levels throughout the ice freezing and frozen food storage compartments. In addition each form of the invention provides a means by which the normal food storage refrigerating portion of the apparatus is prevented from reaching undesirably low temperatures with consequent spoilage of food and excessive dehydration thereof.

All of the absorbers herein disclosed may be provided with known types of inserts which agitate the liquid and inert gas flowing therethroguh to promote absorption and to inhibit stratification in the absorbing solution.

In the foregoing description of all forms of the invention it has been stated that approximately 25% of the total quantity of refrigerant produced may be evaporated in the booster evaporator and that approximately 25% of the total quantity of inert gas in the system may be supplied to the booster evaporator. These are figures which are suitable for one design embodying the invention, however, these proportions are subject to variation with differences in design and operating conditions.

In the Figure 1 form of the invention, from 15 to 40% of the total charge of the gas may be diverted through the absorber extension and low temperature evaporator. From 20 to 40% of the total quantity of liquid refrigerant may be supplied to the low temperature evaporator. The inert gas which has traversed the absorber A may contain, for example, from 7 to 8% ammonia by volume and that portion thereof which flows through the absorber 12 may have its ammonia content reduced to from 3 to 6% ammonia by volume. In general, the absorbing solution will have its ammonia content reduced to 10% by weight in the generator. The ammonia content of the solution will be increased to approximately 14% by weight in the absorber extension 12 and to 22% by weight in the absorber A.

In the Figure 4 form of the invention, the quantity of inert gas circulating in the secondary circuit may be from 15 to 40% of the quantity in the primary inert gas circuit. The percentages of liquid refrigerant supplied to the booster evaporator may be the same as in the Figure 1 form of the invention. The strong and weak solution concentrations will also be the same as from the Figure 1 form of the invention, however, the intermediate solution enriched in the secondary absorber 12' may be increased to as much as 16% ammonia by weight since it must absorb all the refrigerant evaporated in the secondary evaporator. The lean gas supplied to the booster evaporator may contain from 3 to 6% ammonia by volume and will be enriched in the booster evaporator to from 10 to 12% ammonia by volume.

In the Figure 5 form of the invention in which the inert gas is positively propelled and an efficient analyzer is included, the percentages of refrigerant and inert gas supplied to the secondary absorber and evaporator may be substantially the same as those given for the Figure 1 form of the invention, however, in this form of the invent it has been found that a wider range of solution concentrations are feasible and that the inert gas can be stripped to a slightly higher degree in the secondary absorber, for example, the weak solution supplied to the secondary absorber may contain 5% ammonia by weight which will be increased in the secondary absorber to 8 to 9% ammonia by weight and to 32% ammonia by weight in the primary absorber. The inert gas supplied to the secondary absorber may contain 7 to 8% ammonia by volume which will be decreased to 2 to 3% ammonia by volume in the secondary absorber.

It is common to all forms of the invention that the solution is enriched in two stages. In the first stage, the solution contacts a comparatively small volume of inert gas initially having a low concentration of refrigerant. The combination of the small volume of inert gas and its low refrigerant concentration contacting the full volume of weak solution produces a highly stripped inert gas which is supplied to the low temperature evaporator.

While I have illustrated and described the invention in considerable detail, it is to be understood that various changes may be made in the arrangement, proportion and construction of parts without departing from the spirit of the invention or the scope of the appended claims.

I claim:

1. Refrigerating apparatus comprising an insulated cabinet structure including separate freezing and food storage chambers, an absorption refrigerating system charged with a refrigerant, an absorbent for the refrigerant and an inert gas, said refrigerating system associated with said cabinet structure including first and second evaporators arranged to refrigerate said freezing chamber, a third evaporator arranged to refrigerate said food storage chamber, first and second air cooled absorbers, a generator, means providing for flow of absorbing solution from said generator serially through said first and second absorbers in the order named and back to said generator, means for conducting inert gas in a first path of flow in which a major portion of the inert gas in the system flows serially through said second absorber and then through said second and third evaporators, means for conducting inert gas in a second path of flow in which a minor portion of the inert gas in the system flows through said first absorber and then through said first evaporator, and means for liquefying refrigerant vaporized in said generator and for supplying the liquefied refrigerant to said evaporators.

2. A refrigerator comprising a cabinet structure including a freezing chamber and a food storage chamber, refrigerating apparatus associated with said cabinet structure including an evaporator for refrigerating each of said chambers, said refrigerating apparatus forming a path of flow of refrigerant including said evaporators and comprising a conduit arranged to conduct refrigerant liquid to the evaporator for refrigerating said food storage chamber, a second conduit connected to by-pass refrigerant liquid around said evaporator for refrigerating said foot storage chamber, said second conduit including an inverted U-shaped portion adapted when charged with refrigerant vapor to form a liquid flow preventing vapor lock in said by-pass conduit, means for charging said inverted U-shaped conduit with vapor, and thermostatic means for controlling the operation of said charging means.

3. A refrigerator comprising a cabinet structure including a freezing chamber and a food storage chamber, refrigerating apparatus associated with said cabinet structure including an evaporator for refrigerating each of said chambers, said refrigerating apparatus forming a path of flow of refrigerant including said evaporators and comprising a conduit arranged to conduct refrigerant liquid to the evaporator for refrigerating said food storage chamber, a second conduit connected to by-pass refrigerant liquid around said evaporator for refrigerating said food storage chamber, said second conduit including an inverted U-shaped portion adapted when charged with refrigerant vapor to form a liquid flow preventing vapor lock in said by-pass conduit, means for vaporizing refrigerant to charge the upper portion of said inverted U-shaped conduit with refrigerant vapor when a temperature condition produced by said food storage chamber exceeds a predetermined value and for discontinuing such vaporizing action when said temperature condition drops below a predetermined value, a vent conduit connected between the bight portion of said inverted U-shaped conduit and a gas containing portion of the apparatus, and means in said vent conduit for substantially preventing passage of refrigerant therethrough but permitting passage of non-condensible gases.

4. A refrigerator including an insulated cabinet structure interiorly divided into freezing and food storage compartments, an absorption refrigerating apparatus associated with said cabinet structure including first and second evaporators arranged to refrigerate said freezing and food storage compartments respectively, means for supplying refrigerant liquid to each of said evaporators, means including an inverted U-shaped vapor lock conduit for conducting liquid refrigerant from said supply means around said second evaporator to a point of disposal, a heating element in heat exchange relation with the bight portion of said inverted U-shaped conduit and means responsive to the temperature of said food storage compartment for activating and deactivating said heating element to control the flow of refrigerant liquid to said second evaporator.

5. A refrigerator including an insulated cabinet structure interiorly divided into freezing and food storage compartments, an absorption refrigerating apparatus associated with said cabinet structure including first and second evaporators arranged to refrigerate said freezing and food storage compartments respectively, means for supplying refrigerant liquid to each of said evaporators, means including an inverted U-shaped vapor lock conduit for conducting liquid refrigerant from said supply means around said second evaporator to a point of disposal, a heating element in heat exchange relation with the bight portion of said inverted U-shaped conduit and means responsive to the temperature of said food storage compartment for activating and deactivating said heating element to control the flow of refrigerant liquid to said second evaporator, a vent conduit connected between the bight portion of said inverted U-shaped conduit and a vapor containing portion of the system and means in said vent conduit for restricting flow therethrough to a seepage insufficient to eliminate the vapor lock when said heating element is activated.

6. A refrigerator including an insulated cabinet structure interiorly divided into freezing and food storage compartments, an absorption refrigerating system of the heat operated type associated with said cabinet structure and including first and second evaporators arranged to refrigerate said freezing and food storage compartments respectively, means for supplying refrigerant liquid to said evaporators, means including an inverted U-shaped vapor lock conduit for by-passing refrigerant liquid from said supply means around said second evaporator to a point of disposal, a waste products of combustion flue including a branched section, valve means for directing waste products through one or the other of said branched sections of said flue, a U-shaped conduit having one leg thereof connected to the bight portion and the other leg connected to one leg of said inverted U-shaped conduit, the bight portion of said U-shaped conduit being in heat exchange relation with one of the branches of said flue, and means responsive to a condition produced by said second evaporator for governing the position of said valve means.

7. Refrigerating apparatus comprising an insulated cabinet structure including separate freezing and food storage chambers, an absorption refrigerating system charged with a refrigerant, an absorbent for the refrigerant and an inert gas, said refrigerating system associated with said cabinet structure including a first evaporator arranged to refrigerate the upper portion of said freezing chamber, a second evaporator arranged to refrigerate the lower portion of said freezing chamber, a third evaporator arranged to refrigerate the said food storage chamber, first and second absorbers, a generator, means providing for flow of absorbing solution from said generator serially through said first and second absorbers in the order named and back to said generator, means for conducting inert gas in a first path of flow in which a major portion of the inert gas in the system flows serially through said second absorber and then through said second and third evaporators, means for conducting inert gas in a second path of flow in which a minor portion of the inert gas in the system flows through said first absorber and then through said first evaporator, means for liquefying refrigerant vaporized in said generator and for supplying the liquefied refrigerant to said evaporators.

8. Refrigerating apparatus comprising an insulated cabinet structure including separate freezing and food storage chambers, an absorption refrigerating system associated with said cabinet structure and charged with a refrigerant, an absorbent for the refrigerant and an inert gas, said refrigerating system including first and second evaporators arranged to refrigerate said freezing chamber, a third evaporator arranged to refrigerate said food storage chamber, first and second air cooled absorbers, a generator, means providing for flow of absorbing solution from said generator serially through said first and second absorbers in the order named and back to said generator, means for conducting inert gas in a first path of flow in which a major portion of the inert gas in the system flows serially through said second absorber and then through said second and third evaporators and back to said second absorber, means for conducting inert gas in a second path of flow in which a minor portion of the inert gas in the system flows through said first absorber and then through said first evaporator and back to said first absorber, and means for liquefying refrigerant vaporized in said generator and for supplying the liquefied refrigerant to said evaporators.

9. Refrigerating apparatus comprising an insulated cabinet structure including separate freezing and food storage chambers, an absorption refrigerating system charged with a refrigerant, an absorbent for the refrigerant and an inert gas, said refrigerating system associated with said cabinet structure including first and second evaporators arranged to refrigerate said freezing chamber, a third evaporator arranged to refrigerate said food storage chamber, first and second air cooled absorbers, a generator, means providing for flow of absorbing solution from said generator serially through said first and second absorbers in the order named and back to said generator, means for liquefying refrigerant vapor evolved in said generator and for supplying refrigerant liquid to said evaporators, and means providing for circulation of inert gas in a plurality of paths of flow in which the refrigerant vapor content of the inert gas varies between maximum and minimum values including means for conducting inert gas of said maximum refrigerant vapor content through said second absorber wherein its refrigerant vapor content is reduced to a value between said maximum and minimum values and thence through said second and third evaporators, and means for conducting inert gas from a portion of the apparatus normally containing inert gas having a refrigerant vapor content between said maximum and minimum values through said first absorber and then through said first evaporator.

10. Refrigerating apparatus comprising an insulated cabinet structure including separate freezing and food storage chambers, an absorption refrigerating system charged with a refrigerant, an absorbent for the refrigerant and an inert gas, said refrigerating system associated with said cabinet structure, including first and second evaporators arranged to refrigerate said freezing chamber, a third evaporator arranged to refrigerate said food storage chamber, first and second air cooled absorbers, a generator, means providing for flow of absorbing solution from said generator serially through said first and second absorbers in the order named and back to said generator, means forming a plurality of paths of flow of inert gas including means for conducting an inert gas refrigerant vapor mixture enriched in refrigerant vapor in said evaporators through said second absorber, means for conveying a minor part of the inert gas refrigerant vapor mixture which has traversed said second absorber through said first absorber and said first evaporator, means for conveying the major portion of the inert gas refrigerant vapor mixture which has traversed said second absorber through said second and third evaporators, and means for liquefying refrigerant vaporized in said generator and for supplying the liquefied refrigerant to said evaporators.

11. Apparatus according to claim 1 in which said refrigerant liquid supply means includes a conduit for conveying refrigerant liquid to said third evaporator, a by-pass conduit for conveying refrigerant liquid from said first conduit around said third evaporator to a point of disposal and including a flow preventing vapor trap portion, and means for charging said vapor trap portion of said by-pass conduit with vapor when the temperature of said food storage chamber exceeds a predetermined value.

12. A refrigerator including an insulated cabinet structure interiorly divided into freezing and food storage compartments, an absorption refrigerating apparatus associated with said cabinet structure including first and second evaporators arranged to refrigerate said freezing and food storage compartments respectively, means for supplying refrigerant liquid to each of said evaporators, means including an inverted U-shaped vapor lock conduit for conducting liquid refrigerant from said supply means around said second evaporator to a point of disposal, means for charging said inverted U-shaped conduit with vapor, and means responsive to the temperature of said food storage compartment for activating and de-activating said charging means to control the flow of refrigerant liquid to said second evaporator.

13. In a refrigerator, a cabinet structure provided with insulated freezing and food storage chambers, a first evaporator positioned to refrigerate said food storage chamber, a second evaporator positioned to refrigerate the bottom of said freezing chamber, a third evaporator having a smaller capacity than said second evaporator positioned to refrigerate the top portion of said freezing chamber to supplement the action of said second evaporator and to promote air circulation in said freezing chamber, means for circulating inert gas serially through said third and said second and said first evaporators in the order named, means for generating refrigerant vapor, means for condensing said vapor to refrigerant liquid and for supplying a portion of said refrigerant liquid to said third evaporator and the remainder of said refrigerant liquid to said second evaporator, and means for supplying refrigerant liquid which has traversed said third evaporator to said second evaporator.

14. Apparatus according to claim 13 in which said means for supplying refrigerant liquid to said third evaporator passes in heat exchange relation with a portion of said inert gas circulating means containing inert gas leaving one of said evaporators.

15. In a refrigerator, a cabinet structure provided with insulated freezing and food storage chambers, a first evaporator arranged to refrigerate the top portion of said freezing chamber, a second evaporator arranged to refrigerate the bottom portion of said freezing chamber, a third evaporator arranged to refrigerate said food storage chamber, a pair of condensers, means for supplying liquid refrigerant from one of said condensers to said first evaporator, means for supplying liquid refrigerant from the other of said condensers to said second evaporator, means for supplying said second evaporator with liquid refrigerant which has traversed said first evaporator, means for conveying refrigerant liquid from said second evaporator to said third evaporator, and means for circulating an inert gas through said evaporators.

CURTIS C. COONS.

REFERENCES CITED

The following references are of record in the file of this patent:

UNITED STATES PATENTS

| Number | Name | Date |
|---|---|---|
| 2,269,701 | Ullstrand | Jan. 13, 1942 |
| 2,345,505 | Siedle | Mar. 28, 1944 |
| 2,363,446 | Siedle | Nov. 21, 1944 |
| 2,370,267 | Starr | Feb. 27, 1945 |
| 2,426,811 | Backstrom et al. | Sept. 2, 1947 |

FOREIGN PATENTS

| Number | Country | Date |
|---|---|---|
| 317,052 | Great Britain | Aug. 6, 1929 |